(12) United States Patent
Calcaterra et al.

(10) Patent No.: US 9,043,798 B2
(45) Date of Patent: May 26, 2015

(54) REMEDIATING GAPS BETWEEN USAGE ALLOCATION OF HARDWARE RESOURCE AND CAPACITY ALLOCATION OF HARDWARE RESOURCE

(75) Inventors: Jeffrey A. Calcaterra, Chapel Hill, NC (US); Gregory R. Hintermeister, Rochester, MN (US); Michael D. Williams, Newark Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 12/970,754

(22) Filed: Dec. 16, 2010

(65) Prior Publication Data

US 2012/0159367 A1 Jun. 21, 2012

(51) Int. Cl.
*G06F 9/46* (2006.01)
*G06F 9/50* (2006.01)

(52) U.S. Cl.
CPC ...... *G06F 9/5011* (2013.01); *G06F 2209/5019* (2013.01)

(58) Field of Classification Search
None
See application file for complete search history.

(56) References Cited

U.S. PATENT DOCUMENTS

| | | | |
|---|---|---|---|
| 5,774,121 A | 6/1998 | Stiegler | |
| 5,926,817 A | 7/1999 | Christeson et al. | |
| 2003/0236822 A1* | 12/2003 | Graupner et al. | 709/203 |
| 2004/0267897 A1* | 12/2004 | Hill et al. | 709/217 |
| 2006/0247798 A1 | 11/2006 | Subbu et al. | |
| 2007/0006177 A1 | 1/2007 | Aiber | |
| 2007/0277111 A1 | 11/2007 | Bennett et al. | |
| 2008/0059972 A1* | 3/2008 | Ding et al. | 718/105 |
| 2008/0065466 A1 | 3/2008 | Liu | |
| 2008/0140776 A1 | 6/2008 | Horvitz | |
| 2008/0222561 A1 | 9/2008 | Helfman et al. | |
| 2008/0273591 A1* | 11/2008 | Brooks et al. | 375/240.01 |
| 2009/0210378 A1 | 8/2009 | Benson et al. | |
| 2009/0216348 A1 | 8/2009 | Moyne et al. | |

(Continued)

OTHER PUBLICATIONS

Bui T; Ttl.:Building effective multiple criteria decision models: a decision support system approach; Journal Ttl.:Systems, Objectives, Solutions, vol. 4, No. 1, pp. 3-16, 1984.

(Continued)

*Primary Examiner* — James J. Lee
(74) *Attorney, Agent, or Firm* — Feb Cabrasawan

(57) ABSTRACT

A usage allocation of a hardware resource to each of a number of workloads over time is determined using a demand model. The usage allocation of the resource includes a current and past actual usage allocation of the resource, a future projected usage allocation of the resource, and current and past actual usage of the resource. A capacity allocation of the resource is determined using a capacity model. The capacity allocation of the resource includes a current and past capacity and a future projected capacity of the resource. Whether a gap exists between the usage allocation and the capacity allocation is determined using a mapping model. Where the gap exists between the usage allocation of the resource and the capacity allocation of the resource, a user is presented with options determined using the mapping model and selectable by the user to implement a remediation strategy to close the gap.

18 Claims, 10 Drawing Sheets

(56) References Cited

U.S. PATENT DOCUMENTS

| | | |
|---|---|---|
| 2009/0303676 A1 | 12/2009 | Behar et al. |
| 2010/0185768 A1* | 7/2010 | Hamedany et al. ............ 709/226 |
| 2010/0292856 A1* | 11/2010 | Fujita ............................. 700/291 |
| 2011/0173637 A1* | 7/2011 | Brandwine et al. ............ 719/314 |
| 2012/0066687 A1* | 3/2012 | Briscoe et al. ................. 718/104 |
| 2012/0102369 A1* | 4/2012 | Hiltunen et al. ................. 714/48 |

OTHER PUBLICATIONS

Country of Publication: Netherlands; ISSN: 0165-7747; Database: INSPEC.

Menasce, Daniel A. et al.. "Performance by Design: Computer Capacity Planning by Example", Prentice Hall PTR, 2004 Pearson Education, Inc.

* cited by examiner

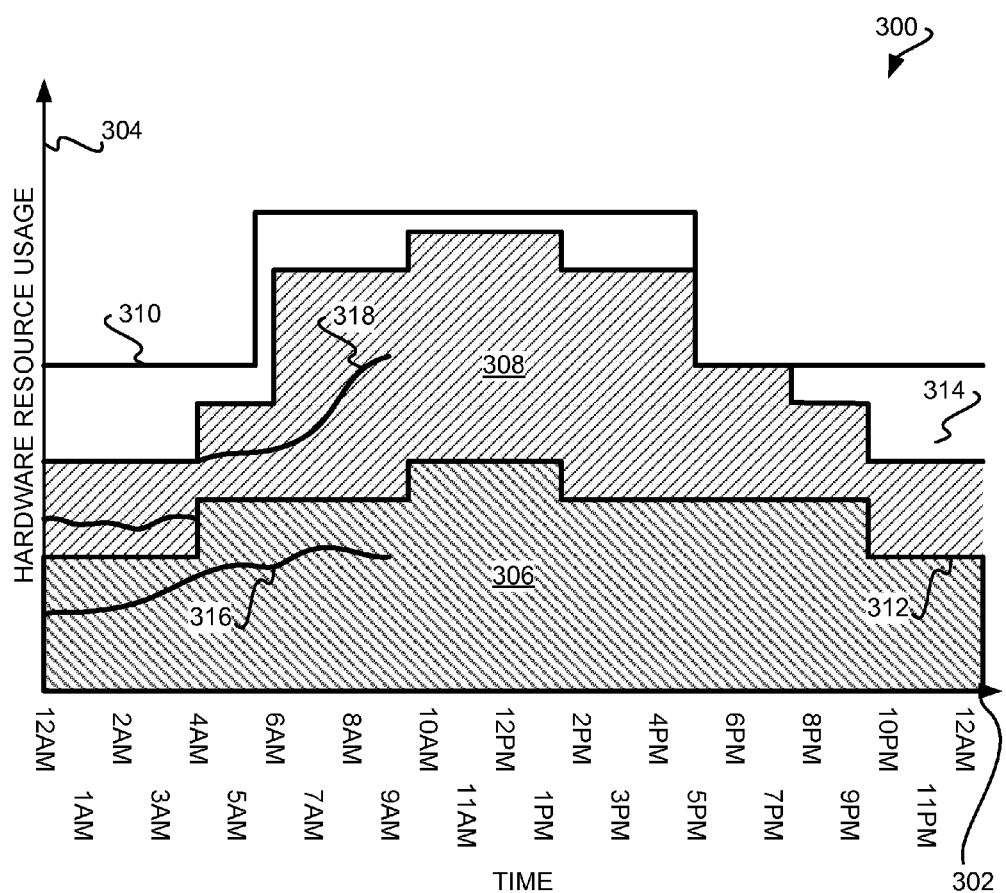

FIG 4B

Capacity Plan Adjustment

The Current configuration will not support the demand at 5:00 PM. The following options can help to guarantee service level. ← 452

| | Scope | CPU | Memory | Network |
|---|---|---|---|---|
| ☑ Suspend Workloads | TimeCard3.2 | 12 Gb/s | .100 GB | 1 Mb/s |
| ☑ Override Server Sleep Policies | Blade123 | 100 Gb/s | 4 GB | 10 Mb/s |
| ☐ Override High Availability Policies | Select | | | |
| Total Selected Capacity | | 112 Gb/s | 4.10 GB | 11 Mb/s |
| Total Needed Capacity | | 104 Gb/s | 4.00 GB | 8 Mb/s |

454 { CPU, Memory, Network rows 1-2 }
458 { CPU, Memory, Network totals rows }
456 → (arrow to checkboxes)
450 (overall)
460 → OK

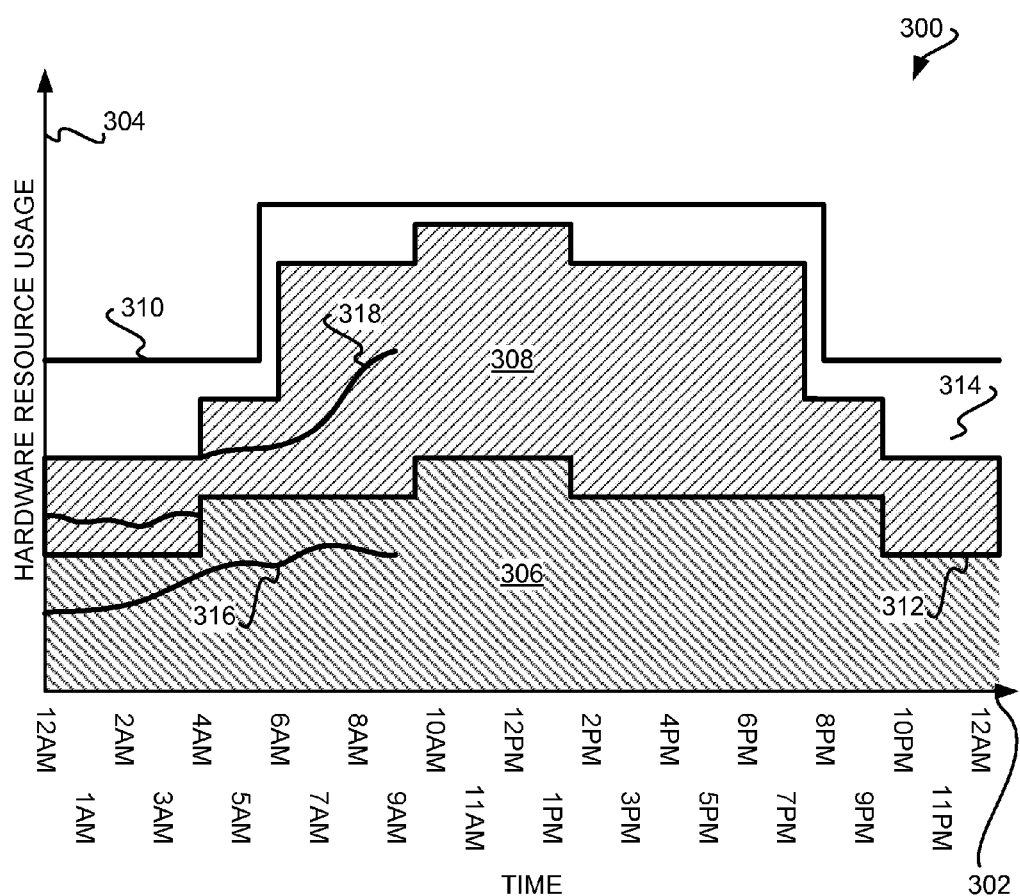

REMEDIATING GAPS BETWEEN USAGE ALLOCATION OF HARDWARE RESOURCE AND CAPACITY ALLOCATION OF HARDWARE RESOURCE

BACKGROUND

In distributed computing architectures, a given application computer program or a collection of application computer programs, referred to as a workload, shares hardware resources of computing devices with other workloads. Examples of such hardware resources include processor time, memory, and networking bandwidth. The workloads are thus executed in a distributed manner using the same hardware resources of the computing devices. Each hardware resource may be allocated differently to the workloads. For example, the usage allocation of a hardware resource to a first workload may be different than the usage allocation of this hardware resource to a second workload.

SUMMARY OF THE INVENTION

A method of an embodiment of the invention includes determining, by a processor, a usage allocation of a hardware resource to each workload of a number of workloads over time, using a demand model. The usage allocation of the hardware resource includes a current and past actual usage allocation of the hardware resource, a future projected usage allocation of the hardware resource, and a current and past actual usage of the hardware resource as monitored. The method includes determining, by the processor, a capacity allocation of the hardware resource, using a capacity model. The capacity allocation of the hardware resource including a current and past capacity of the hardware resource and a future projected capacity of the hardware resource. The method includes determining, by the processor, whether a gap exists between the usage allocation of the hardware resource and the capacity allocation of the hardware resource, using a mapping model. The method includes, in response to determining that the gap exists between the usage allocation of the hardware resource and the capacity allocation of the hardware resource, presenting a user with one or more options determined by the processor using the mapping model and selectable by the user to implement a remediation strategy to close the gap.

A computer program product of an embodiment of the invention includes a computer-readable storage medium having computer-readable code embodied therein. The computer-readable code is executable by a processor. The computer-readable code includes first computer-readable code to determine a usage allocation of a hardware resource to each workload of a number of workloads over time, using a demand model. The usage allocation of the hardware resource includes a current and past actual usage allocation of the hardware resource, a future projected usage allocation of the hardware resource, and a current and past actual usage of the hardware resource as monitored. The computer-readable code includes second computer-readable code to determine a capacity allocation of the hardware resource, using a capacity model. The capacity allocation of the hardware resource including a current and past capacity of the hardware resource and a future projected capacity of the hardware resource. The computer-readable code includes third computer-readable code to determine whether a gap exists between the usage allocation of the hardware resource and the capacity allocation of the hardware resource, using a mapping model. The computer-readable code includes fourth computer-readable code to determine that the gap exists between the usage allocation of the hardware resource and the capacity allocation of the hardware resource, and to present a user with one or more options determining using the mapping model and selectable by the user to implement a remediation strategy to close the gap.

A system of an embodiment of the invention includes one or more computing devices, a hardware resource at the one or more computing devices and to be used by a number of workloads, a computer-readable data storage storing a computer program implementing a demand model, a capacity model, and a mapping model, and a processor to execute the computer program. The computer program is to determine a usage allocation of the hardware resource to each workload using the demand model. The usage allocation of the hardware resource including a current and past actual usage allocation of the hardware resource, a future projected usage allocation of the hardware resource, and a current and past actual usage of the hardware resource as monitored. The computer program is to determine a capacity allocation of the hardware resource using the capacity model. The capacity allocation of the hardware resource including a current and past capacity of the hardware resource and a future projected capacity of the hardware resource. The computer program is to determine whether a gap exists between the usage allocation of the hardware resource and the capacity allocation of the hardware resource, using the mapping model. The computer program is to present a user with one or more options determining using the mapping model and selectable by the user to implement a remediation strategy to close the gap.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 3 is a diagram of an exemplary graph generated by the method of FIG. 1, according to an embodiment of the invention.

FIG. 4B is a graphical user interface by which the method of FIG. 4A can be implemented, according to an embodiment of the invention.

FIG. 5 is a diagram of the exemplary graph of FIG. 3 after it has been forecast that the usage allocation of a hardware resource to a particular workload will be insufficient to accommodate this workload's actual usage of the resource, according to an embodiment of the invention.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, workloads may be executed in a distributed manner using the same hardware resources of a number of computing devices. Each workload includes a given application computer program, or a number of application computer programs. Each workload is said to have a usage allocation of a particular hardware resource, which may differ from the usage allocations of this hardware resource to other workloads. Examples of hardware resources include processors, memory, storage space, communication bandwidth, and so on.

Embodiments of the present invention determine a usage allocation of a hardware resource to each workload of a number of workloads using a demand model. A capacity allocation of the hardware resource is also determined, using a capacity model. Where a gap exists between the usage allocation of the hardware resource and the capacity allocation of the hardware resource, as determined using a mapping model, a remediation strategy is determined to close the gap, also using the mapping model.

Figure 1:
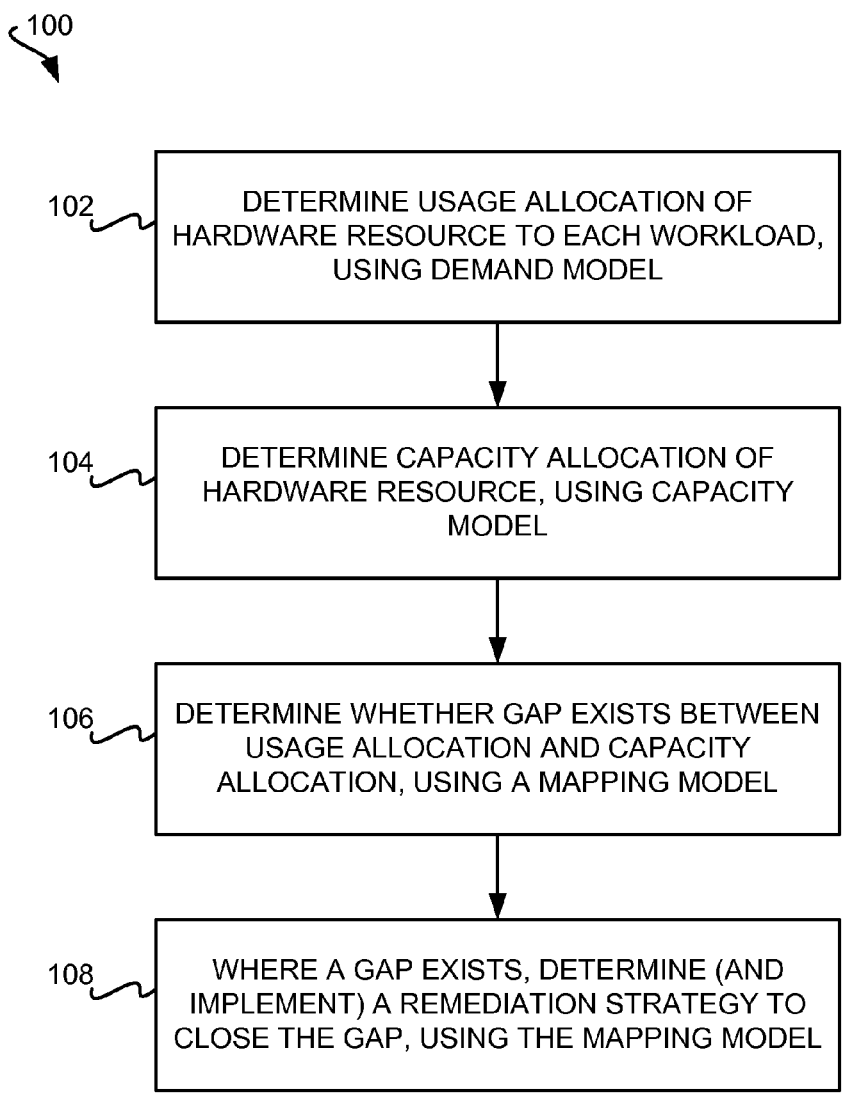
FIG. 1 is a flowchart of a method for managing a hardware resource used by multiple workloads, according to an embodiment of the invention.

FIG. 1 shows a method 100 used to manage a hardware resource used by multiple workloads, according to an embodiment of the invention. The method 100 is performed in relation to a hardware resource, such as processor time, memory, or network bandwidth. The hardware resource is typically distributed over one or more computing devices of one or more computing systems. For example, where the hardware resource is processor time, the processors of the computing devices of the computing systems can each perform tasks over processor cycles (i.e., time).

The method 100 may be performed by a processor of a computing device. The processor may thus execute a computer program, such as a management application computer program, to perform the method 100. The computing device may be one of the computing device(s) over which the hardware resource is distributed. Alternatively, the computing device may be a different computing device, apart from the computing device(s) at which the hardware resource is located.

The method 100 is further performed in relation to workloads. A workload is an application computer program, or a collection of application programs. The workload is executed using the hardware resource in question.

A usage allocation of the hardware resource to each workload is determined by using a demand model (102). The usage allocation of the hardware resource includes a current and past actual usage allocation of the hardware resource, as well as a future projected usage allocation of the hardware resource. The demand model is a model that determines the usage allocation of the hardware resource, such as on a per-workload basis, or in consideration of multiple workloads as a group. Examples of the demand model are described later in the detailed description.

The usage allocation of the hardware resource to a given workload can include the amount of the hardware resource that usage of the given workload is expected to require, as well as the actual amount of the hardware resource that the given workload actually used (i.e., the actual usage of the hardware resource, both currently and in the past). The usage allocation of the hardware resource to a given workload can increase from an expected usage by a certain amount, but cannot infinitely increase. The amount of the hardware resource may be denoted differently depending on the hardware resource in question. For example, processor time may be measured in terms of number of processor cycles, whereas communication bandwidth may be measured in bits-per-second, such as gigabits-per-second.

Part 102 of the method 100 can include aggregating the usage allocation of the hardware resource to each workload over time, to yield a total usage allocation of the hardware resource to all workloads over time. The total usage allocation of the hardware resource to all workloads is less than the available usage allocation of the hardware resource. Stated another way, usage of the hardware resource cannot be overallocated to the workloads. If there are two workloads having individual usage allocations A and B of the hardware resource, to yield a total usage allocation A+B of the hardware resource, then A+B$\leq$C, where C is the maximum available usage allocation of the hardware resource. Note that if A+B=C during a given period of time, then this means that the hardware resource is being completely utilized during this time period.

Furthermore, it is noted that in one embodiment, part 102 balances the demand model for a workload with the actual demand (current and past) by the workload. That is, the usage allocation of a hardware resource to a workload includes both the maximum amount of the hardware resource that the workload can utilize at a given time, based on the demand model, as well as the actual demand of the hardware resource by the workload. In this way, it can be determined whether a workload is using significantly less of a hardware resource than the workload is permitted to utilize, for instance, or whether a workload is using nearly all of the hardware resource that the workload is permitted to utilize.

A capacity allocation of the hardware resource is determined by using a capacity model (104). The capacity allocation of the hardware resource includes the current and past capacity of the hardware resource, as well as a future projected capacity of the hardware resource. The capacity model is a model that determines the capacity of the hardware resource. The capacity model may specify the capacity allocation of the hardware resource as the total capacity of the hardware resource that can be allocated to the workloads, minus an overhead amount.

The capacity of the hardware resource is the total amount of the hardware resource that can be allocated to the workloads at a given time. The capacity of the hardware resource may also be denoted differently depending on the hardware resource in question. As described above, for instance, processor time may be measured in terms of number of processor cycles, whereas communication bandwidth may be measured in bits-per-second, such as gigabits-per-second.

An example of the capacity model is a model that specifies when certain computing devices that contribute to the hardware resource are online and are offline. For example, each day a percentage of the total number of computing devices that contribute to processor time may be on during certain times, and off during other times. Other computing devices that contribute to processor time may be on all the time during each day. Therefore, the capacity model in this example specifies for each point in time the total amount of processor time that is available, depending on which computing devices are online at any given point in time.

It is noted, however, that the capacity model can be more complicated than just adding together the available memory or processor time provided by computing devices that will be online. For instance, computing devices can be powered down to save energy if their hardware resources are not required, and can further go offline when they fail and/or are being repaired. The computing devices may also be subject to planned outages for reboots, upgrades, and so on. The computing devices in question can be an external hardware resource, such as that which is referred to as "cloud computing," in which the hardware resources are typically provided by a third party for a relatively large number of users, and accessed over a large network, such as the Internet.

Furthermore, the capacity model can encompass mappings between hardware resources, such as processor time and memory, that are on the same system, such as the same computing device as one example. For example, there may be X amount of processor time available, and Y amount of memory available. However, the capacity model can further specify that $X=X1+X2+X3$, for instance, and $Y=Y1+Y2+Y3$, where X1 and Y1 are on the same system, X2 and Y2 are on the same system, and X3 and Y3 are on the same system. This information may be required if a particular workload needs to use both processor time and memory that are part of the same system, for performance or other reasons.

The usage allocation of the hardware resource and the capacity allocation of the hardware resource are directly comparable. If the usage allocation of the hardware resource is less than or equal to the capacity allocation of the hardware resource at a given point in time, then the workloads are not starved of the hardware resource at this point in time. By comparison, if the usage allocation of the hardware resource is greater than the capacity allocation of the hardware resource at a given point in time, then the workloads are starved of the hardware resource at this point in time. As such, performance of one or more of the workloads may suffer, because these workloads cannot in actuality be allocated a portion of the hardware resource as specified by the usage allocation.

Therefore, the method 100 determines whether a gap exists between the usage allocation of the hardware resource and the capacity allocation of the hardware resource, using a mapping model (106). The gap is a positive gap, in that if the usage allocation of the hardware resource minus the capacity allocation of the hardware resource is more than zero at a given point in time, then it is said that a gap exists. The mapping model is thus a model that takes as input the usage allocation of the hardware resource, determined via the demand model, and the capacity allocation of the hardware resource, determined via the capacity model, and determines whether a corresponding gap exists between the usage allocation and the capacity allocation.

The method 100 makes the determination in part 106 both at the current time and at future times. For instance, at the current time, the method 100 determines whether the actual usage of the hardware resource by the workloads is greater than the capacity of the hardware resource. By comparison, at future times, the method 100 determines whether the future projected usage of the hardware resource by the workloads is greater than the future projected capacity of the hardware resource.

In response to determining that there is a (positive) gap between the usage allocation of the hardware resource and the capacity allocation of the hardware resource, a remediation strategy to close the gap is determined, and potentially implemented, using the mapping model (106). The remediation strategy is a way to ensure that the usage allocation of the hardware resource does not exceed the capacity allocation of the hardware resource at a future time. The remediation strategy is also a way to overcome the situation where the current usage of the hardware resource exceeds the current capacity of the hardware resource at the present time.

The mapping model in this respect has built-in approaches that can be offered to the user as alternatives to close the gap between the usage allocation of the hardware resource and the capacity allocation of the hardware resource. The mapping model may take into account the manner by which the demand model determined the usage allocation of the hardware resource, such that modifications to this usage allocation can close the gap. The mapping model may further take into account the manner by which the capacity model determined the capacity allocation of the hardware resource, such that modifications to this capacity allocation can close the gap. Examples of the mapping model are described later in the detailed description.

As intimated above, the usage allocation of a workload is the maximum amount of the hardware resource that the workload is permitted to use over time. For example, if the hardware resource is computing time, where 100% is the total amount of computing time of the processors, then the usage allocation of the hardware resource to a workload is a percentage less than 100% of the computing time that the hardware resource can provide at any given time. The usage allocation of the hardware resource to each workload can be determined such that one or more policies regarding the usage of the hardware resource by each workload is taken into account.

For example, a policy may specify that a given workload is to run on dedicated hardware, such its own computing device. As such, no other workload is permitted to run on this dedicated hardware. As another example, a policy may specify that a given workload is to be fully redundant, such that two instances of the workload are to be running at all times. As a third example, a policy may specify that a first workload is not to run on the same hardware, such as the same computing device, as a second workload.

Figure 2A:
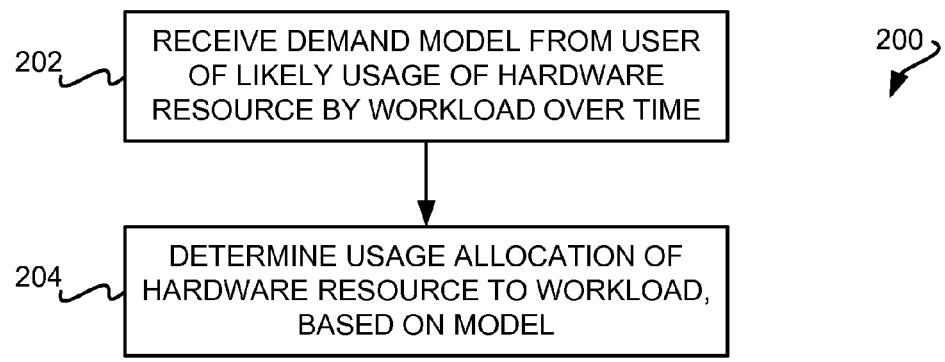
FIGS. 2A, 2B, 2C, and 2D are flowcharts of a method for determining the usage allocation of a hardware resource to a given workload, according to varying embodiments of the invention.
Figure 2B:
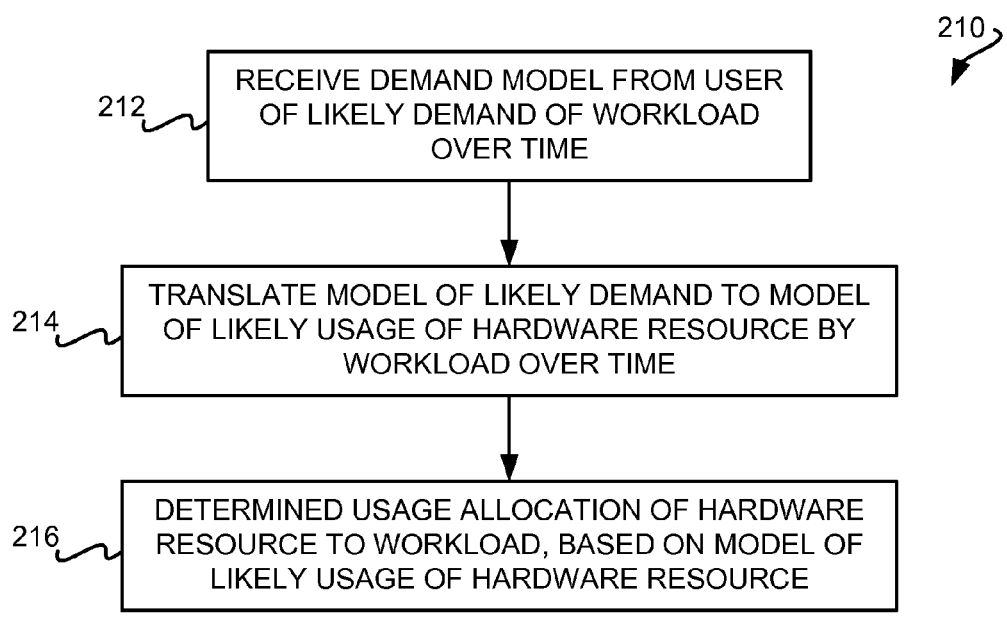
Figure 2C:
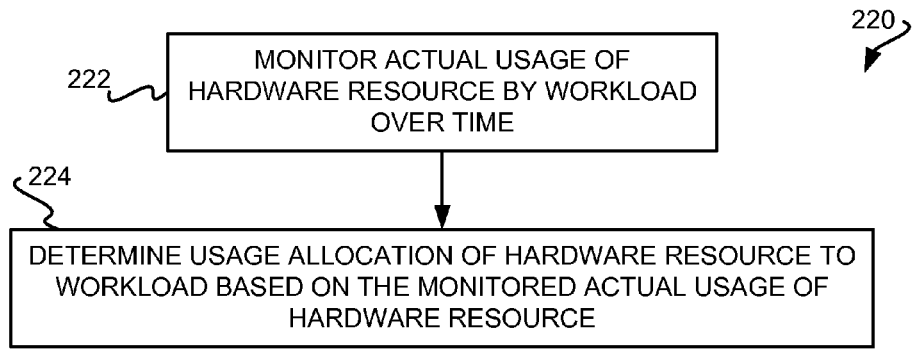
Figure 2D:
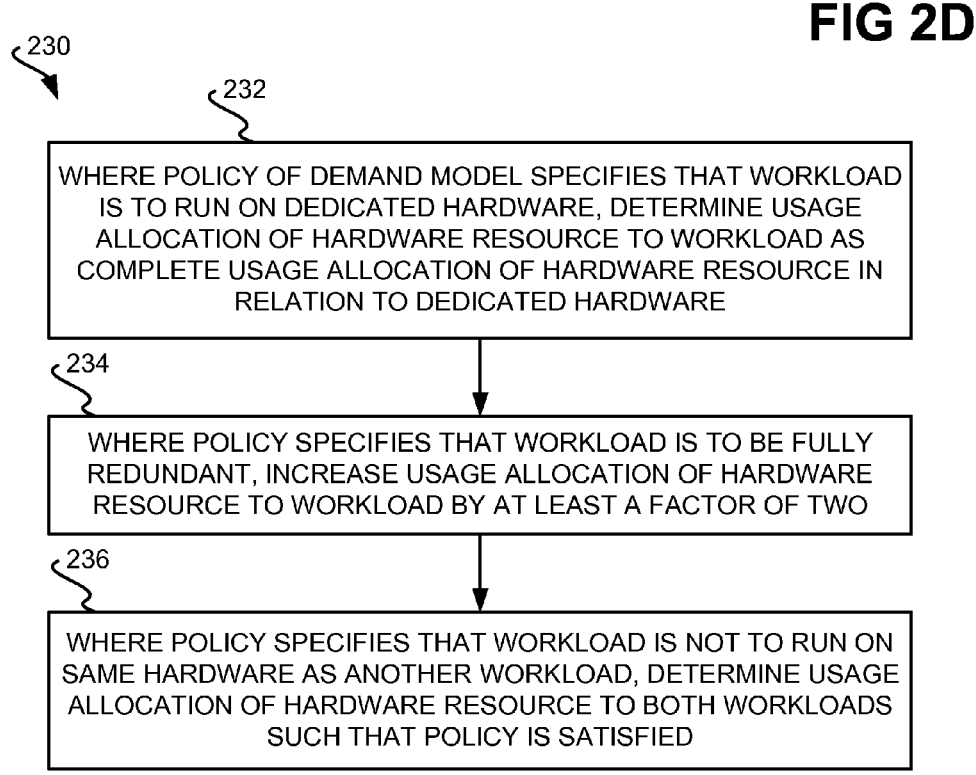

Different types of workloads may have their usage allocations of the hardware resource determined differently. FIGS. 2A, 2B, 2C, and 2D show methods 200, 210, 220, and 230 for determining the usage allocation of the hardware resource to a workload, according to different embodiments of the invention. FIGS. 2A, 2B, and 2C show how usage allocation of the hardware resource to a workload in accordance with varying models. By comparison, FIG. 2D shows how usage allocation of the hardware resource to a workload in accordance with varying policies. For a given workload, either FIG. 2A, 2B, or 2C can be used, and FIG. 2D can alternatively or additionally be used, to determine the usage allocation of the hardware resource to the workload over time in part 102 of the method 100.

In FIG. 2A, the method 200 is in accordance with a hardware-demand model. Specifically, a demand model is received from the user (202). The model specifies the likely usage of the hardware resource by the workload over time. The usage allocation of the hardware resource to the workload can then be determined based on this model (204). For example, if the model specifies the number of processor cycles that the workload is to use during each period of time, this number of processor cycles may be divided by the total number of processor cycles available during each period of time to determine the usage allocation of the hardware resource to the workload over time (206). This technique can further be implemented in one embodiment as described in the copending patent application entitled "apparatus, system, and method for defining normal and expected usage of a computing resource," filed on Oct. 15, 2009, and assigned application Ser. No. 12/580,023.

In FIG. 2B, the method 210 is in accordance with a workload-demand model. As before, a demand model is received from the user (212). However, the model of FIG. 2B specifies the likely demand of the workload over time, in a unit of measure other than a unit of measure of the usage allocation of the hardware resource. Whereas the model of FIG. 2A can be directly translated to usage allocation of the hardware resource to the workload, the model of FIG. 2B cannot. For example, the model of FIG. 2B may be for an Internet web server application computer program, where this computer program receives a number of requests, or "hits," from web browsing clients over time.

As such, the model of likely demand of the workload over time is translated to a model of likely usage of the hardware resource by the workload over time (214). This translation can be performed by using a model that translates workload demand to hardware resource usage. For example, in a simple such model where the workload demand is specified in client requests per period of time, the translation may have two levels.

The first level corresponds to client requests below a threshold, and the second level corresponds to client requests above the threshold. For each period of time, if the number of client requests is less than the threshold, then a first conversion factor may be used to convert the number of requests to, for instance, processor cycles. If the number of client requests is greater than the threshold, then a second conversion factor may be used to convert the number of requests to processor cycles, where the second conversion factor is different from the first conversion factor. Once the model of likely demand has been translated to a model of likely usage, the usage allocation of the hardware resource to the workload over time can be determined based on the model of likely usage of the hardware resource by the workload (216), as in part 204 of FIG. 2A.

In FIG. 2C, the method 220 is in accordance with a batch process-demand model. The actual usage of the hardware resource by the workload over a time is monitored (222). It is expected that the actual usage of the hardware resource by the workload is periodic in nature; therefore, the period of time over which the actual usage is monitored is sufficiently long so that at least one such period elapses. The result of part 222 is a demand model similar to that of FIG. 2A, except whereas the model of FIG. 2A is of likely usage of the hardware resource, the result of part 222 in FIG. 2C is of actual usage of the hardware resource. The usage allocation of the hardware resource over time is then determined based on this model (i.e., based on the monitored actual usage of the hardware resource) (224), as in part 204 of FIG. 2A.

In FIG. 2D, the method 230 is in accordance with a demand model having a policy that governs the workload in relation to which the usage allocation is being determined, and/or in accordance with a policy that governs other such workloads. If the policy specifies that the workload is to run on dedicated hardware, such as its own computing device, then the usage allocation of the hardware resource is determined as the complete usage allocation of the hardware resource in relation to this dedicated hardware (232). For example, a workload may by itself just require X cycles-per-second of processor time during a given period of time. However, if the workload is to run on dedicated hardware, and if this dedicated hardware has a processor that can provide Y>X cycles-per-second of processor time during a given period of time, then the usage allocation of the hardware resource is determined as the complete usage allocation Y of processor time that can be provided by the dedicated hardware.

If the demand model's policy specifies that the workload is to be fully redundant, then the usage allocation of the hardware resource to the workload over time that may have been determined in FIG. 2A, 2B, or 2C is increased by at least a factor of two for each period of time (234). It is noted in this respect that the demand model specifies the usage allocation of the hardware resource on a per-workload basis. By comparison, what can be referred to as an aggregate demand model is the summation of usage allocations of the hardware resource to all the workloads, and may not be considered as part of the demand model that specifies the usage allocation for each workload on a per-workload basis.

Fully redundant to some extent is synonymous with highly available, and means that a workload has more hardware resources allocated to it than required, so that if any of the hardware resources fail, the workload is still able to operate. For example, it may have been determined in FIG. 2A, 2B, or 2C that the workload has a usage allocation of the hardware resource of X for a given period of time. Therefore, in accordance with part 234, this usage allocation of the hardware resource is increased to 2X+A for this time period. Because the workload is to be fully redundant, the usage allocation of the hardware resource correspondingly doubles, hence the multiple of two, since two instances of the workload are executed or run. Furthermore, the parameter A specifies the usage allocation of the hardware resource needed to continually or periodically synchronize these two instances of the workload.

If the demand model's policy specifies that the workload is not to run on the same hardware as another workload, then the usage allocation of the hardware resource to each of these two workloads is determined such that the policy is satisfied (236). Part 236 can involve a more complex series of calculations. For example, a first workload may not be able to be executed on the same hardware as a second workload. If the first workload has been assigned to run on computing device A, then the portion of the hardware resource in question attributable to computing device A cannot be allocated to the second workload. If no other workloads are present, then in effect the first workload runs in isolation on computing device A, no different than in part 232. However, if one or more other workloads are present, then these other workloads may be able to run in conjunction with the first workload on computing device A.

Determining whether a gap exists in part 106 of the method 100 can include monitoring the actual usage of the hardware resource by each workload over time, and by displaying a graph including the usage allocation of the hardware resource to each workload and the actual usage of the hardware resource by each workload, can be displayed. The graph further includes a maximum amount of potential usage of the hardware resource. The maximum amount of potential usage of the hardware resource is the maximum available usage of the hardware resource.

FIG. 3 shows a representative such graph 300, according to an embodiment of the invention. The x-axis 302 of the graph 300 denotes time, particularly the twenty-four hours of an exemplary day. The y-axis 304 of the graph 300 denotes usage of the hardware resource.

Along the y-axis 304, the graph 300 is segmented, over time as denoted by the x-axis 302, in correspondence with the usage allocation of the hardware resource to each workload over time. In the example of FIG. 3, there are two workloads. The portion 306 over which the graph 300 is segmented along the y-axis 304 corresponds to the usage allocation of the hardware resource to the first workload over time. The portion 308 over which the graph 300 is segmented along the y-axis 304 corresponds to the usage allocation of the hardware resource to the second workload over time.

The line 310 represents the maximum available usage of the hardware resource over time. In example of FIG. 3, the maximum available usage of the hardware resource increases at 5:30 AM, and then decreases back to its prior level at 5:00 PM. This can correspond to an additional computing device being turned on and coming online at 5:30 AM, and then going offline and being turned off at 5:00 PM. As such, between 5:30 AM and 5:00 PM, the maximum available usage of the hardware resource increases, because the hardware resource attributable to this additional computing device is available only during 5:30 AM and 5:00 PM.

The line 312 represents the usage allocation of the hardware resource to the first workload over time. In the example of FIG. 3, the first workload's usage allocation of the hardware resource increases at 4:00 AM, and then decreases back to its prior level at 9:30 PM. The first workload's usage allocation of the hardware resource also increases at 9:30 AM, and decreases back to its prior level at 1:30 PM. The usage allocation of the hardware resource to the first workload may be determined as has been described in relation to FIGS. 2A-2D.

The line 314 represents the usage allocation of the hardware resource to the second workload over time. In the example of FIG. 3, the second workload's usage allocation of the hardware resource increases at 6:00 AM. The second workload's usage allocation of the hardware resource should desirably decrease back to its prior level at 7:30 PM. However, at 5:00 PM, the maximum available usage of the hardware resource decreases.

This means that the second workload's usage allocation abruptly and undesirably decreases as well. As such, it may be forecast that the usage allocation of the hardware resource to the second workload will be insufficient to accommodate the second workload's actual usage of the hardware resource between 5:00 PM and 7:30 PM, as is described in more detail later in the detailed description. This is because the usage allocation of the hardware resource to a workload is based at least in part on an expected actual usage of the hardware resource by the workload, such that if the workload's usage allocation of the hardware resource is insufficient, the actual usage of the hardware resource by the workload may not be able to be accommodated.

It is noted that the line 314 increases at 4:00 AM and decreases at 9:30 PM as well. However, this increase and this decrease do not correspond to changes in the usage allocation of the hardware resource to the second workload. Rather, the usage allocation of the hardware resource to the first workload increase and decrease at 4:00 AM and at 9:30 PM, respectively. Because the portion 308 corresponding to the second workload is on top of the portion 306 corresponding to the first workload in the graph 300, the line 314 for the second workload rises and falls as the line 312 for the first workload rises and falls. However, the usage allocation of the hardware resource to the second workload does not change at 4:00 AM and at 9:30 PM, as evidenced by the distance over the y-axis 304 between the lines 314 and 312 remaining constant at both these times.

The line 316 represents the actual usage of the hardware resource by the first workload. Similarly, the line 318 represents the actual usage of the hardware resource by the second workload. In the example of FIG. 3, the lines 316 and 318 end at 9:00 AM. This may be because it is currently 9:00 AM. While the usage allocations of the hardware resource to the first and second workloads can be determined for the future, the actual usage of the hardware resource by the first and second workloads can be monitored just until the current time.

Therefore, determining whether a gap exists in part 106 of the method 100 can include forecasting a likelihood that the usage allocation of the hardware resource to a particular workload will be insufficient to accommodate actual usage of the hardware resource by the particular workload at a specific future time may be forecast. For instance, if the total usage allocation of the hardware resource to all workloads is temporarily determined as being greater than the available usage allocation of the hardware resource at a specific future time, then the usage allocations of the hardware resource to one or more workloads have to decrease. This is because the total usage allocation of the hardware resource to all the workloads cannot exceed the available usage allocation of the hardware resource at any given time.

For example, as described in relation to the graph 300 of FIG. 3, a computing device may go offline at a particular time, resulting in the hardware resource attributable to this computing device also going offline. As such, the available usage allocation of the hardware resource decreases. If the available usage allocation of the hardware resource decreases below the total usage allocation of the hardware resource to all the workloads, then the usage allocations of the hardware resource to one or more workloads has to decrease. As such, it may be forecast that the usage allocations of the hardware to the workload(s) that have had their usage allocations decreased are likely to be insufficient to accommodate actual usage of the hardware resource by these workload(s).

As another example, at a particular time the usage allocation of the hardware resource to a workload may increase. However, if the resulting total usage allocation of the hardware resource to all the workloads is greater than the available usage allocation of the hardware resource, then this workload's usage allocation of the hardware resource may not be permitted to increase as much as desired. Alternatively, another workload's usage allocation of the hardware resource may be forced to decrease. As such, it may be forecast that the usage allocation of the hardware to such a workload is insufficient to accommodate actual usage of the hardware resource by this workload.

Figure 4A:
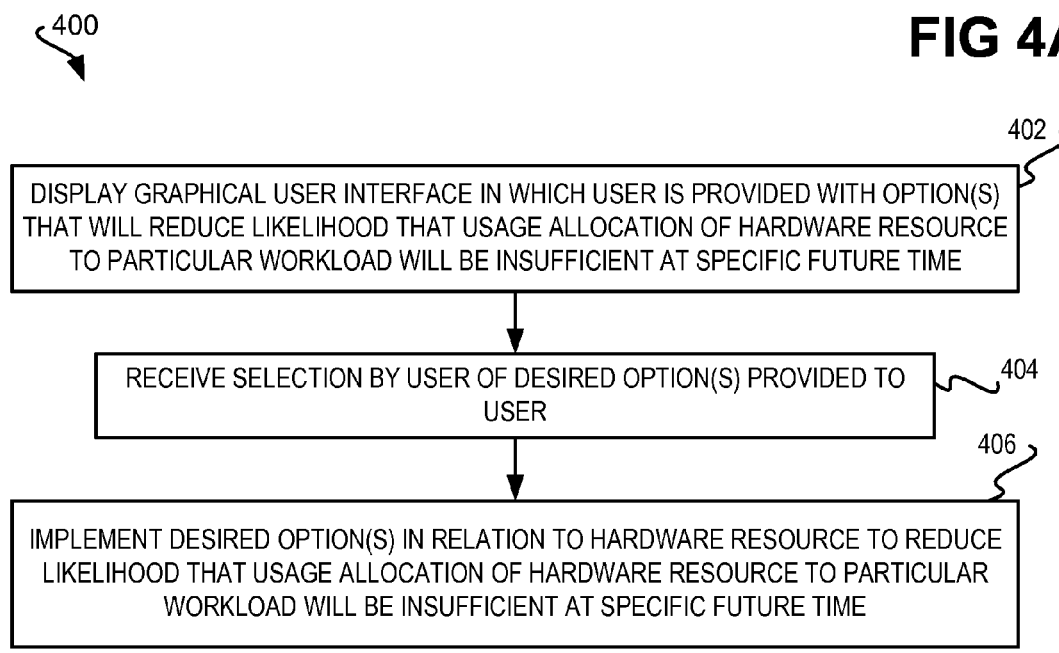
FIG. 4A is a flowchart of a method for determining and implementing a remediation strategy to close a gap between usage allocation of a hardware resource and capacity allocation of the hardware resource, according to an embodiment of the invention.

FIG. 4A shows a method 400 for determining and implementing a remediation strategy to close a gap between usage allocation of the hardware resource and capacity allocation of the hardware resource, using a mapping model (400). As such, the method 400 can be used to implement part 108 of the method 100. A graphical user interface can be displayed to the user (402). The graphical user interface includes one or more options that are dictated by the user.

As such, the user is provided with one or more selectable options that if selected by the user will reduce the likelihood that the usage allocation of the hardware resource to the particular workload in question will be insufficient at the specific future time. The user is permitted to select one or more of these options, such that if implemented, the available usage allocation of the hardware resource will remain equal to or greater than the total usage allocation of the hardware resource to all the workloads at the specific future time. The graphical user interface may be implemented as a dialog box in which checkboxes are presented next to the options that the user can select. The dialog box may further include a running calculation as to the effect of these options on the available usage allocation of the hardware resource and/or on the total usage allocation of the hardware resource to all the workloads, at the specific future time.

A first such option relates to a demand model that specifies that a given workload is to run on dedicated hardware, as has been described above in relation to part 232 of FIG. 2D. The first option permits the user to override this model so that the model is at least temporarily ignored. As such, if the available usage allocation of the hardware resource to the given workload would normally be X, but is Y>X due to the effect of this model, then there is a constrained usage allocation of the hardware resource is equal to the usage allocation of the hardware resource to the given workload that is attributable to satisfying the model, namely, Y−X. By at least temporarily ignoring this model, this constrained usage allocation of the hardware resource becomes available for the particular workload in question.

A second option relates to a demand model that specifies that a given workload is to be fully redundant, as has been described above in relation to part 234 of FIG. 2D. The second option permits the user to override this model so that the model is at least temporarily ignored. As such, if the available usage allocation of the hardware resource to the given workload would normally by X, but is 2X+A due to the effect of this model, then there is a constrained usage allocation of the hardware resource that is equal to the usage allocation of the hardware resource to the given workload that is attributable to satisfying the model, namely X+A. By at least temporarily ignoring this model, this constrained usage allocation of the hardware resource becomes available for the particular workload in question.

A third option relates to a demand model that specifies that a first workload is not to be run on a same hardware as a second workload, as has been described above in relation to part 236 of FIG. 2D. The third option permits the user to override this model so that the model is at least temporarily ignored. As such, any constrained usage allocation of the hardware resource that is attributable to satisfying this model becomes available for the particular workload in question.

A fourth option relates to preventing a computing device that contributes to the hardware resource from going offline at the specific future time in accordance with a capacity model. The fourth option permits the user to at least temporarily prevent a portion of the hardware resource to be offline, at least at the specific future time, and thus to at least temporarily ignore the capacity model in this respect. As such, the available usage allocation of the hardware resource will not decrease at the specific future time, resulting in an increase in the available usage allocation of the hardware resource as compared to if the fourth option were not selected.

A fifth option relates to making available an additional amount of the hardware resource at the specific future time. The fifth option thus permits the user to increase the available usage allocation of the hardware resource by the added amount. The added amount may be in the form of bringing an additional computing device online that can contribute to the hardware resource in question. The capacity model is thus ignored or overridden in the fifth option.

The user therefore selects one or more desired options from these and/or other options presented to him or her within the graphical user interface, and such selection is received (404).

In response, the selected (i.e., desired) options are implemented in relation to the hardware resource to reduce the likelihood that the usage allocation of the hardware resource to the particular workload will become insufficient at the specific future time in question (406). As described, then, a user is permitted to both view allocations of usage of the hardware resource to the workloads and actual usage of the hardware resource by the workloads, and is further able to ensure that the workloads can optimally perform without being starved in their allocations of usage of the hardware resource.

FIG. 4B shows a user interface 450 by which the method 400 can be implemented, according to an embodiment of the invention. The user interface 450 may take the form of a graphical user interface, such as a window, a pop-up, and/or a dialog box, as is explicitly depicted in the example of FIG. 4B. The user interface 450 may alternatively take the form of a different type of user interface, such as a command line interface, or another type of user interface.

In the example of FIG. 4B, the text 452 indicates to the user that the usage allocations of the hardware resources to the workloads will not be supported by the capacity allocation of the hardware resource. The user is then provided with a number of options 454 to change the usage allocation and/or the capacity allocation to overcome this problem. The user can select the options via checkboxes 456, where the results of effecting the selected options are depicted in area 458. Once the user is satisfied with his or her selections, the user selects the OK button 460 to implement the select options.

FIG. 5 shows the graph 300 of FIG. 3 after representative performance of the method 400, according to an embodiment of the invention. Like-numbered reference numbers in FIGS. 3 and 5 refer to the same axes, portions, and lines in FIG. 5 as they do in FIG. 3. As has been described above, it may be forecast that the usage allocation of the hardware resource to the second workload, represented by the portion 308, will be insufficient to accommodate the second workload's actual usage of the hardware resource between 5:00 PM and 7:30 PM in FIG. 3. This is because in FIG. 3, the maximum available usage of the hardware resource decreases, such as due to a computing device going offline at 5:00 PM, but the usage allocation of the hardware resource desirably not decreasing back to its pre-4:00 AM level until 7:30 PM.

Therefore, the user may have the option to prevent the computing device from going offline until after 7:30 PM, such as at 8:00 PM, to reduce the likelihood that the usage allocation of the hardware resource to the second workload will be insufficient to accommodate the second workload's actual usage of the hardware resource between 5:00 PM and 7:30 PM. It is assumed that the user selects this option. As such, the option is implemented, and the likelihood that the usage allocation of the hardware resource to the second workload will be insufficient to accommodate the second workload's actual usage of the hardware resource between 5:00 PM and 7:30 PM is reduced.

FIG. 5 thus shows the graph 300 after such an option has been implemented. In particular, the maximum available usage of the hardware resource, as represented by the line 310, decreases at 8:00 PM in FIG. 5, instead of at 5:00 PM as in FIG. 3. Therefore, the usage allocation of the hardware resource to the second workload is permitted to remain at the same level from 5:00 PM to 7:30 PM in FIG. 5, instead of abruptly decreasing at 5:00 PM as in FIG. 3. The likelihood that the usage allocation of the hardware resource to the second workload will be insufficient to accommodate the second workload's actual usage of the hardware resource between 5:00 PM and 7:30 PM is thus reduced.

Figure 6:
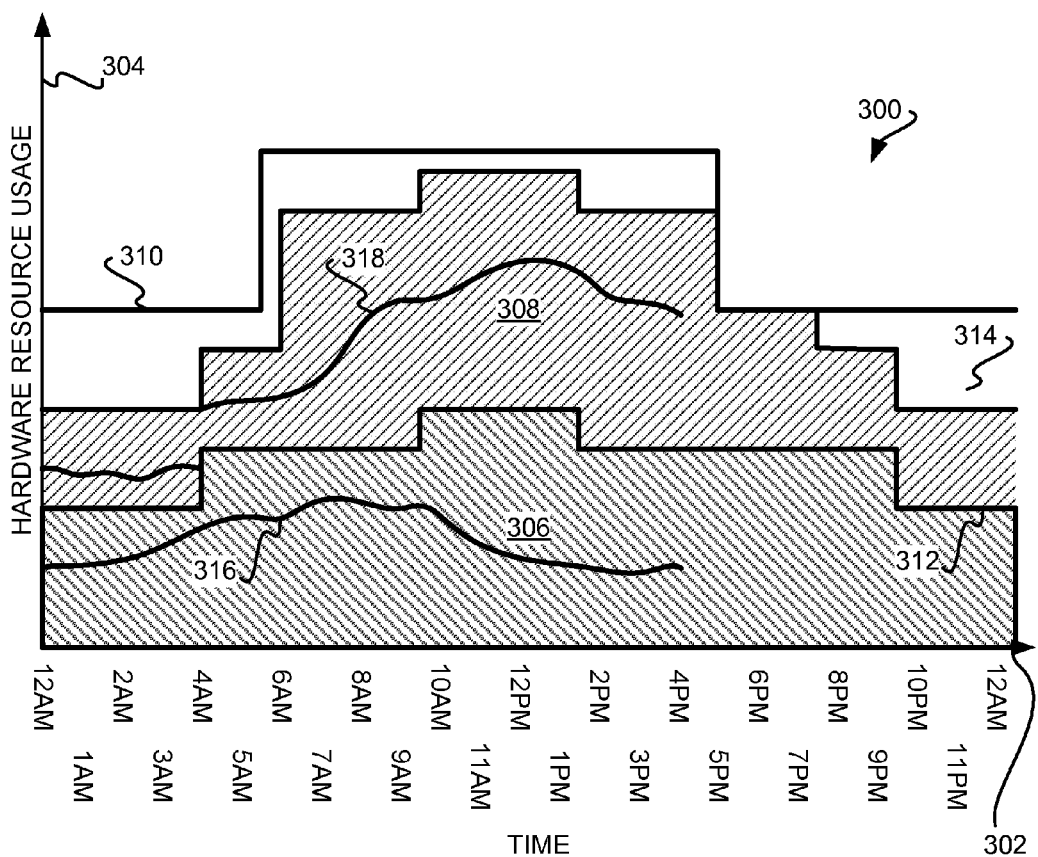
FIGS. 6 and 7 are diagrams of variations of the exemplary graph of FIG. 3, to depict another approach by which it can be forecast whether the usage allocation of a hardware resource to a particular workload will be insufficient to accommodate this workload's actual usage of the resource, according to embodiments of the invention.

FIG. 6 shows the graph 300, according to another embodiment of the invention. Like-numbered reference numbers in FIGS. 3 and 6 refer to the same axes, portions, and lines in FIG. 6 as they do in FIG. 3. In FIG. 6, the actual usage of the hardware resource by the second workload, as represented by the line 318, is trending downwards. Therefore, even though the usage allocation of the hardware resource to the second workload is less than the maximum desired usage allocation starting at 5 PM, it can be determined that there is low or even no likelihood that the usage allocation of the hardware resource to the second workload will be insufficient to accommodate the second workload's actual usage of the hardware resource at this time. This is because the line 318 is trending in such a way that at 5 PM it will likely stay below the line 314, which represents the usage allocation of the hardware resource to the second workload.

Figure 7:
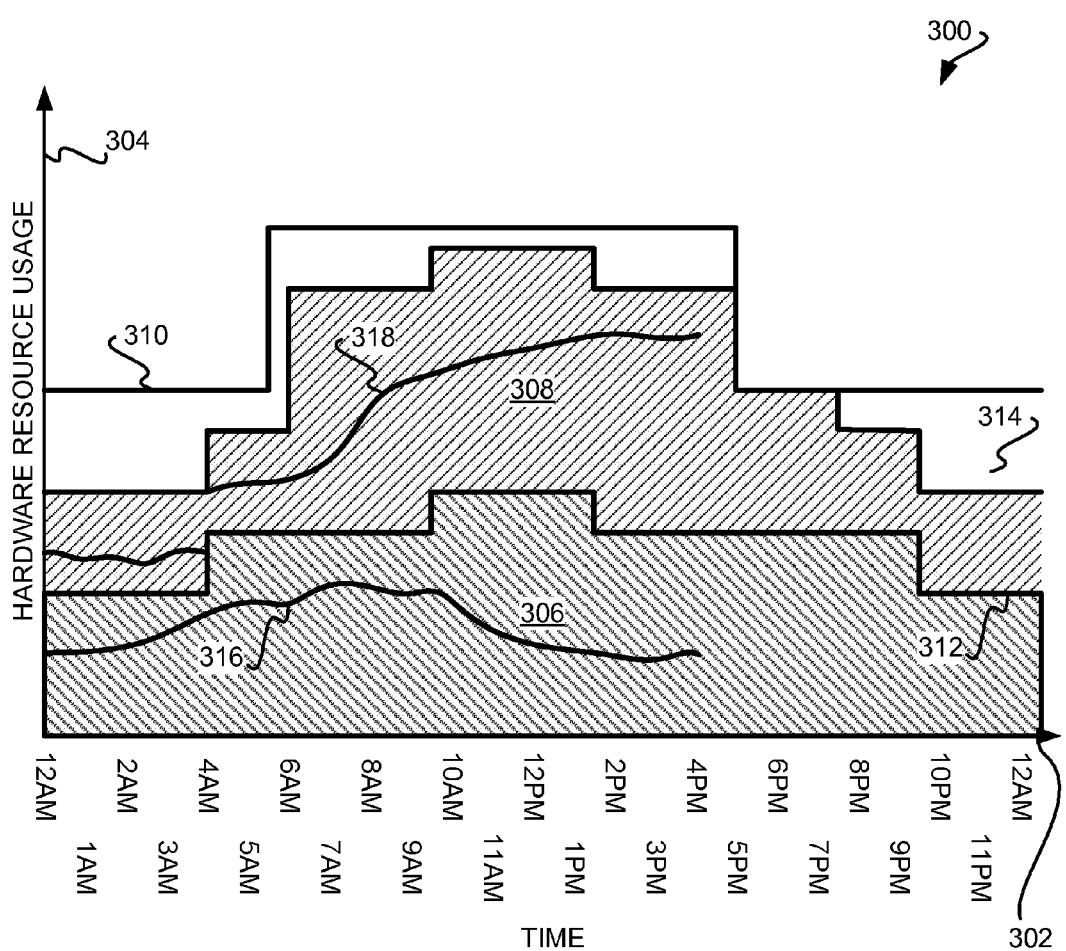

By comparison, FIG. 7 shows the graph 300, according to still another embodiment of the invention. Like-numbered reference numbers in FIGS. 3 and 7 refer to the same axes, portions, and lines in FIG. 7 as they do in FIG. 3. In FIG. 7, the actual usage of the hardware resource by the second workload, as represented by the line 318, is trending upwards. Therefore, it is determined that there is a great likelihood that the usage allocation of the hardware resource to the second workload will be insufficient to accommodate the second workload's actual usage of the hardware resource starting at 5 PM, when the usage allocation for the second workload decreases. This is because the line 318 is trending in such a way that at 5 PM it will likely cross and be above the line 314, which represents the usage allocation of the hardware resource to the second workload.

Therefore, FIGS. 6 and 7 show another approach by which the likelihood that the usage allocation of the hardware resource to a workload will be insufficient to accommodate the workload's actual usage of a hardware resource, as compared to the approach described in relation to FIG. 3. In FIGS. 6 and 7, the trending of the actual usage of the hardware resource by the workload is used to determine this likelihood. By comparison, in FIG. 3, the maximum desired usage allocation for the hardware resource is used to determine this likelihood.

Figure 8:
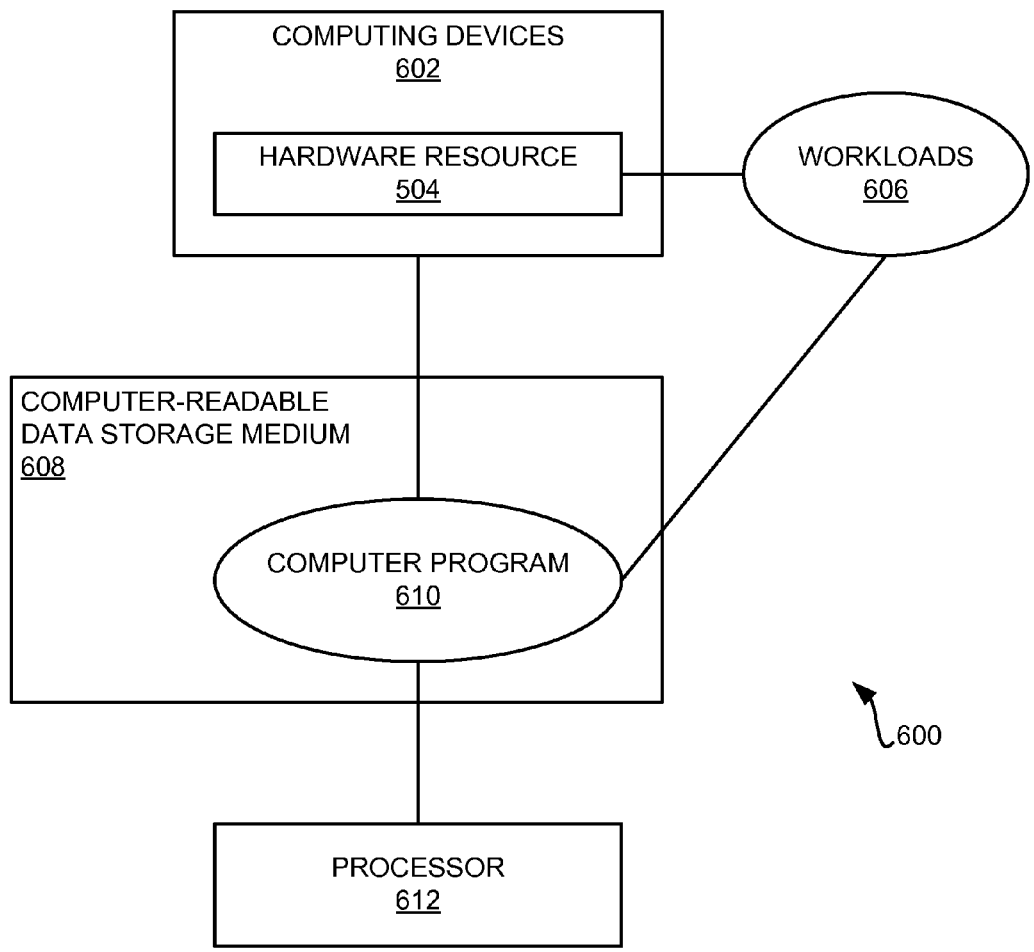
FIG. 8 is a diagram of a rudimentary system, according to an embodiment of the invention.

In conclusion, FIG. 8 shows a rudimentary system 600, according to an embodiment of the invention. The system 600 includes one or more computing devices 602 at which a hardware resource 604 of the system 600 is located. The hardware resource is used by workloads 606. The system 600 also includes a computer-readable data storage medium 608 storing a computer program 610 that is executable by the processor 612 of the system 600. The computer-readable data storage medium 608 and the processor 612 may be part of the computing devices 602, or part of a different computing device. Execution of the computer program 610 from the computer-readable data storage medium 608 by the processor 612 causes the method 100 of FIG. 1 to be performed, as has been described, in relation to the hardware resource 604 and in relation to the workloads 606.

Finally, it is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
  forecasting, by a processor, a future usage allocation of a hardware resource to each workload of a plurality of workloads over time, using a demand model, the future usage allocation of the hardware resource specifying a future projected usage allocation of the hardware resource, based on at least a current and past actual usage of the hardware resource as monitored, by one of:
    the demand model specifying a given workload is to run on dedicated hardware, and the forecasting includes determining the future usage allocation of the hardware resource to the given workload as a complete usage allocation of the hardware resource in relation to the dedicated hardware;
    the demand model specifying that the given workload is to be fully redundant, and the forecasting includes increasing the future usage allocation of the hardware resource to the given workload by at least a factor of two;
  forecasting, by the processor, a future capacity allocation of the hardware resource, using a capacity model, the future capacity allocation of the hardware resource specifying a future projected capacity of the hardware resource, the future capacity allocation specifying a total amount of the hardware resource that is allocatable to the workloads at a given future time, the capacity model specifying at least when computing devices that contribute to the hardware resource are online and are offline at future times, such that the future capacity allocation is forecast based on when the computing devices that contribute to the hardware resource are online and are offline at the future times;
  determining, by the processor, whether a future gap is predicted to occur between the future usage allocation of the hardware resource and the future capacity allocation of the hardware resource in that the future usage allocation of the hardware resource is greater than the future capacity allocation of the hardware resource at the future times, using a mapping model; and
  in response to determining that the future gap is predicted to occur, presenting a user with one or more options determined by the processor using the mapping model and selectable by the user to implement a remediation strategy to prevent the future gap from actually occurring, including when the future capacity allocation is less than the future usage allocation, one of the options including permitting the user to manually cause more of the computing devices to be online at the future times when the future gap is predicted so that the future gap does not actually occur,
  wherein the future capacity allocation of the hardware resource denotes how much of the hardware resource is available to the workloads, regardless of whether the workloads need or request to use the hardware resource.

2. The method of claim 1, wherein forecasting the future usage allocation of the hardware resource to a given workload over time, using the demand model, comprises:
  receiving, from the user, the demand model in relation to the given workload, the demand model as received from the user specifying likely usage of the hardware resource by the given workload over time; and,
  determining the future usage allocation of the hardware resource to the given workload, based on the likely usage of the hardware resource by the given workload over time.

3. The method of claim 1, wherein forecasting the future usage allocation of the hardware resource to a given workload of the plurality of workloads over time, using the demand model, comprises:
  receiving, from the user, the demand model in relation to the given workload, the demand model as received from the user specifying likely demand of the given workload over time, where the likely demand has a unit of measure other than a unit of measure of the future usage allocation of the hardware resource;

translating the likely demand of the given workload over time as received from the user to a likely usage of the hardware resource by the given workload over time; and, determining the future usage allocation of the hardware resource to the given workload, based on the likely usage of the hardware resource by the given workload over time.

4. The method of claim 1, wherein forecasting the future usage allocation of the hardware resource to a given workload of the plurality of workloads over time, using the demand model, comprises:

monitoring the actual usage of the hardware resource by the given workload over time, as specified by the demand model in relation to the given workload;

determining the future usage allocation of the hardware resource to the given workload, based on the actual usage of the hardware resource by the given workload over time as has been monitored.

5. The method of claim 1, wherein forecasting the future usage allocation of the hardware resource to a first workload and to a second workload of the plurality of workloads over time, using the demand model, comprises:

where the demand model specifies that the first workload is not to run on a same hardware as the second workload, determining the future usage allocation of the hardware resource to the first workload and to the second workload such that the demand model is satisfied.

6. The method of claim 1, wherein forecasting the future usage allocation of the hardware resource to each workload, using the demand model, comprises:

aggregating the future usage allocation of the hardware resource to each workload over time, to yield a total future usage allocation of the hardware resource to all the workloads over time.

7. The method of claim 1, wherein determining whether the future gap exists between the future usage allocation of the hardware resource and the future capacity allocation of the hardware resource, using the mapping model, comprises:

displaying a graph having a first axis denoting time and a second axis denoting usage of the hardware resource.

8. The method of claim 7, wherein the graph further includes a maximum amount of potential usage of the hardware resource.

9. The method of claim 7, wherein the graph is segmented within the second axis, over time as denoted by the first axis, in correspondence with the future usage allocation of the hardware resource to each workload, wherein a current and past actual usage of the hardware resource by each workload is represented as a line within a segment of the graph corresponding to the current and past usage allocation of the hardware resource to the workload.

10. The method of claim 1, wherein determining whether the future gap exists between the future usage allocation of the hardware resource and the future capacity allocation of the hardware resource, using the mapping model, comprises:

forecasting a likelihood that the future usage allocation of the hardware resource to a particular workload of the plurality of workloads will be insufficient to accommodate actual usage of the hardware resource by the particular workload at a specific future time, using the mapping model, wherein presenting the user with the one or more options comprises:

displaying a graphical user interface as dictated by the mapping model, a user provided with the one or more options within the graphical user interface that will reduce the likelihood that the future usage allocation of the hardware resource to the particular workload will be insufficient to accommodate the usage of the hardware resource by the particular workload at the specific future time;

receiving a selection by the user of one or more desired options of the options provided to the user; and, implementing the desired options in the relation to the hardware resource to reduce the likelihood that the future usage allocation of the hardware resource to the particular workload will be insufficient to accommodate the actual usage of the hardware resource by the particular workload at the specific future time.

11. The method of claim 10, wherein displaying the graphical user interface in which a user is provided with the options that will reduce the likelihood that the future usage allocation of the hardware resource to the particular resource will be insufficient to accommodate the usage of the hardware resource by the particular workload at the specific future time comprises:

where the demand model specifies that a given workload is to run on dedicated hardware, displaying the graphical user interface in which the user is provided with a given option of the options, the given option to at least temporarily ignore the demand model, such that at least temporarily ignoring the demand model results in an increase in available usage allocation of the hardware resource to the particular workload by a constrained usage allocation of the hardware resource, wherein the constrained usage allocation of the hardware resource is equal to the future usage allocation of the hardware resource to the given workload that is attributable to satisfying the demand model.

12. The method of claim 10, wherein displaying the graphical user interface in which a user is provided with the options that will reduce the likelihood that the future usage allocation of the hardware resource to the particular resource will be insufficient to accommodate the usage of the hardware resource by the particular workload at the specific future time comprises:

where the demand model specifies that a given workload is to be fully redundant, displaying the graphical user interface in which the user is provided with a given option of the options, the given option to at least temporarily ignore the demand model, such that at least temporarily ignoring the demand model results in an increase in available usage allocation of the hardware resource to the particular workload by a constrained usage allocation of the hardware resource, wherein the constrained usage allocation of the hardware resource is equal to the future usage allocation of the hardware resource to the given workload that is attributable to satisfying the demand model.

13. The method of claim 10, wherein displaying the graphical user interface in which a user is provided with the options that will reduce the likelihood that the future usage allocation of the hardware resource to the particular resource will be insufficient to accommodate the usage of the hardware resource by the particular workload at the specific future time comprises:

where the demand model specifies that a first workload is not to run on a same hardware as a second workload, displaying the graphical user interface in which the user is provided with a given option of the options, the given option to at least temporarily ignore the demand model, such that at least temporarily ignoring the demand model results in an increase in available usage allocation of the hardware resource to the particular workload by a constrained usage allocation of the hardware resource,
wherein the constrained usage allocation of the hardware resource is equal to the future usage allocation of the hardware resource to the first workload and to the second workload that is attributable to satisfying the demand model.

14. The method of claim 10, wherein displaying the graphical user interface in which a user is provided with the options that will reduce the likelihood that the future usage allocation of the hardware resource to the particular resource will be insufficient to accommodate the usage of the hardware resource by the particular workload at the specific future time comprises:
where the capacity model specifies a portion of the hardware resource is scheduled to be offline at the specific future time, displaying the graphical user interface in which the user is provided with a given option of the options, the given option to prevent the portion of the hardware resource to be offline at the specific future time,
such that preventing the portion of the hardware resource to be offline at the specific future time results in an increase in available usage allocation of the hardware resource to the particular workload.

15. The method of claim 10, wherein displaying the graphical user interface in which a user is provided with the options that will reduce the likelihood that the future usage allocation of the hardware resource to the particular resource will be insufficient to accommodate the usage of the hardware resource by the particular workload at the specific future time comprises:
displaying the graphical user interface in which the user is provided with a given option of the options, the given option to make available an additional amount of the hardware resource at the specific future time,
such that making available the additional amount of the hardware resource at the specific future time results in an increase in available usage allocation of the hardware resource to the particular workload.

16. The method of claim 1, wherein the hardware resource is distributed over the computing devices of one or more hardware systems,
and wherein each workload encompasses one or more application computer programs running on the computing devices.

17. A non-transitory storage device storing computer-readable code executable by a processor, the computer-readable code comprising:
first computer-readable code to forecast a future usage allocation of a hardware resource to each workload of a plurality of workloads over time, using a demand model, the future usage allocation of the hardware resource specifying a future projected usage allocation of the hardware resource, based on at least a current and past actual usage of the hardware resource as monitored, by one of:
the demand model specifying a given workload is to run on dedicated hardware, and the forecasting includes determining the future usage allocation of the hardware resource to the given workload as a complete usage allocation of the hardware resource in relation to the dedicated hardware;
the demand model specifying that the given workload is to be fully redundant, and the forecasting includes increasing the future usage allocation of the hardware resource to the given workload by at least a factor of two;
second computer-readable code to forecast a future capacity allocation of the hardware resource, using a capacity model, the future capacity allocation of the hardware resource specifying a future projected capacity of the hardware resource, the future capacity allocation specifying a total amount of the hardware resource that is allocatable to the workloads at a given future time, the capacity model specifying at least when computing devices that contribute to the hardware resource are online and are offline at future times, such that the future capacity allocation is forecast based on when the computing devices that contribute to the hardware resource are online and are offline at the future times;
third computer-readable code to determine whether a future gap is predicted to occur between the future usage allocation of the hardware resource and the future capacity allocation of the hardware resource in that the future usage allocation of the hardware resource is greater than the future capacity allocation of the hardware resource at the future times, using a mapping model; and
fourth computer-readable code to, in response to determining that the future gap is predicted to occur, present a user with one or more options determined using the mapping model and selectable by the user to implement a remediation strategy to prevent the future gap from actually occurring, including when the future capacity allocation is less than the future usage allocation, one of the options including permitting the user to manually cause more of the computing devices to be online at the future times when the future gap is predicted so that the future gap does not actually occur, wherein the future capacity allocation of the hardware resource denotes how much of the hardware resource is available to the workloads, regardless of whether the workloads need or request to use the hardware resource.

18. A system comprising:
one or more computing devices;
a hardware resource at the one or more computing devices and to be used by a plurality of workloads;
a computer-readable data storage storing a computer program implementing a demand model, a capacity model, and a mapping model; and,
a processor to execute the computer program,
wherein the computer program is to:
forecast a future usage allocation of the hardware resource to each workload over time, using the demand model, the future usage allocation of the hardware resource specifying a future projected usage allocation of the hardware resource, based on at least a current and past actual usage of the hardware resource as monitored, by one of:
the demand model specifying a given workload is to run on dedicated hardware, and the forecasting includes determining the future usage allocation of the hardware resource to the given workload as a complete usage allocation of the hardware resource in relation to the dedicated hardware;
the demand model specifying that the given workload is to be fully redundant, and the forecasting includes increasing the future usage allocation of the hardware resource to the given workload by at least a factor of two;
forecast a future capacity allocation of the hardware resource, using the capacity model, the future capacity allocation of the hardware resource specifying a future projected capacity of the hardware resource, the future capacity allocation specifying a total amount of the hardware resource that is allocatable to the workloads at a given future time, the capacity model specifying at least when computing devices that contribute to the hardware resource are online and are offline at future times, such that the future capacity allocation is forecast based on when the computing devices that contribute to the hardware resource are online and are offline at the future times;

determine whether a future gap is predicted to occur between the future usage allocation of the hardware resource and the future capacity allocation of the hardware resource in that the future usage allocation of the hardware resource is greater than the future capacity allocation of the hardware resource at the future times, using the mapping model; and in response to determining that the future gap is predicted to occur, present a user with one or more options determined using the mapping model and selectable by the user to implement a remediation strategy to prevent the future gap from actually occurring, including when the future capacity allocation is less than the future usage allocation, one of the options including permitting the user to manually cause more of the computing devices to be online at the future times when the future gap is predicted so that the future gap does not actually occur, wherein the future capacity allocation of the hardware resource denotes how much of the hardware resource is available to the workloads, regardless of whether the workloads need or request to use the hardware resource.

* * * * *